(12) United States Patent
Gostylla

(10) Patent No.: US 9,724,750 B2
(45) Date of Patent: Aug. 8, 2017

(54) FASTENER DELIVERY APPARATUS

(75) Inventor: Wojciech Gostylla, Queensland (AU)

(73) Assignee: Henrob Limited, Flintshire (GB)

( * ) Notice: Subject to any disclaimer, the term of this patent is extended or adjusted under 35 U.S.C. 154(b) by 736 days.

(21) Appl. No.: 13/878,009

(22) PCT Filed: Oct. 6, 2011

(86) PCT No.: PCT/GB2011/001449
§ 371 (c)(1),
(2), (4) Date: Apr. 5, 2013

(87) PCT Pub. No.: WO2012/046002
PCT Pub. Date: Apr. 12, 2012

(65) Prior Publication Data
US 2013/0223956 A1    Aug. 29, 2013

(30) Foreign Application Priority Data
Oct. 8, 2010 (GB) .................................. 1017004.1

(51) Int. Cl.
*B21J 15/32* (2006.01)
*B21J 15/02* (2006.01)
(Continued)

(52) U.S. Cl.
CPC .............. *B21J 15/32* (2013.01); *B21J 15/02* (2013.01); *B21J 15/025* (2013.01); *B23P 19/006* (2013.01); *B23P 19/062* (2013.01)

(58) Field of Classification Search
None
See application file for complete search history.

(56) References Cited

U.S. PATENT DOCUMENTS 1,635,909 A * 7/1927 Tobeler ................. B21D 28/34
279/30
2,244,048 A * 6/1941 Butter .................... B21J 15/025
227/149

(Continued)

FOREIGN PATENT DOCUMENTS

CH          372622       10/1963
DE        29617208       12/1996
(Continued)

OTHER PUBLICATIONS

International Search Report and Written Opinion for Application No. PCT/GB2011/001449 dated Mar. 19, 2012 (13 pages).
(Continued)

*Primary Examiner* — Hemant M Desai
*Assistant Examiner* — Mobeen Ahmed
(74) *Attorney, Agent, or Firm* — Michael Best & Friedrich LLP

(57) ABSTRACT

A fastener delivery apparatus includes a nose assembly to releasably hold a fastener. The nose assembly includes a plurality of balls or rollers and associated biasing members to provide a biasing force which biases the balls or rollers such that they engage with the fastener. Each biasing member exerts force in a first direction and an associated ball or roller moves in a second direction which is different from the first direction. A force transfer surface is provided between the ball or roller and the biasing member, the force transfer surface acting to convert at least a component of the force exerted by the biasing member in the first direction into force exerted on the balls or rollers in the second direction.

23 Claims, 16 Drawing Sheets

(51) Int. Cl.
    *B23P 19/00* (2006.01)
    *B23P 19/06* (2006.01)

(56) References Cited

U.S. PATENT DOCUMENTS

| | | | |
|---|---|---|---|
| 2,390,318 A | 12/1945 | Claggett | |
| 2,538,895 A * | 1/1951 | Brennan | B25C 1/00 227/139 |
| 2,893,008 A * | 7/1959 | Gagnon | H05K 13/0495 174/260 |
| 2,904,787 A * | 9/1959 | De Caro | B25C 1/188 227/10 |
| 4,176,699 A | 12/1979 | Leitner | |
| 4,197,886 A * | 4/1980 | MacDonald | B23B 31/1071 173/59 |
| 4,201,325 A | 5/1980 | Jochum | |
| 4,237,946 A * | 12/1980 | Leitner | B25B 23/10 279/75 |
| 4,485,956 A * | 12/1984 | van Iperen | B25C 1/02 173/132 |
| 4,519,536 A * | 5/1985 | Steigauf | B25C 1/00 227/147 |
| 5,000,631 A * | 3/1991 | Deutschenbaur | B23B 31/008 279/101 |
| 5,398,860 A * | 3/1995 | Edwards | B21J 15/32 227/119 |
| 5,417,376 A * | 5/1995 | Holmes | B02C 18/304 241/82.5 |
| 5,779,127 A * | 7/1998 | Blacket | B21J 15/025 227/107 |
| 5,813,114 A * | 9/1998 | Blacket | B21J 15/32 227/119 |
| 6,015,962 A | 1/2000 | Wiessler et al. | |
| 6,126,370 A | 10/2000 | Wheeler et al. | |
| 6,592,015 B1 * | 7/2003 | Gostylla | B21J 15/025 227/107 |
| 6,976,403 B2 * | 12/2005 | Oblizajek | B62D 7/222 74/552 |
| 7,401,394 B1 * | 7/2008 | Muller | B23P 19/062 29/243.5 |
| 2002/0014422 A1 * | 2/2002 | Coonrod | B21J 15/025 206/338 |
| 2004/0217144 A1 * | 11/2004 | Matthews | B21J 15/025 227/119 |

FOREIGN PATENT DOCUMENTS

| | | |
|---|---|---|
| EP | 0387430 | 9/1990 |
| EP | 0567240 | 10/1993 |
| EP | 0922538 | 6/1999 |
| EP | 0746431 | 4/2003 |
| JP | S51-113282 | 10/1976 |
| JP | S52-135500 | 11/1977 |
| JP | S52-140099 | 11/1977 |
| JP | S56-067973 | 6/1981 |
| JP | 59097820 | 6/1984 |
| JP | S62-053965 | 4/1987 |
| JP | H04-032866 | 3/1992 |
| JP | H07-241780 | 9/1995 |
| JP | H07-290183 | 11/1995 |
| JP | H08-505089 | 6/1996 |
| WO | 93/09918 | 5/1993 |
| WO | 93/10925 | 6/1993 |
| WO | 94/15736 | 7/1994 |

OTHER PUBLICATIONS

Office Action from the Japanese Patent Office action for Application No. 2013-532259 dated Aug. 24, 2015 (11 pages).

* cited by examiner

FASTENER DELIVERY APPARATUS

BACKGROUND OF THE INVENTION

I. Field of the Invention

The present invention relates to fastener delivery apparatus.

II. Description of Related Art

The term "fastener" is used herein to include rivets, screws, slugs, weld studs, mechanical studs and other types of fastening devices.

Known fastener delivery apparatus include a nose assembly into which a rivet is passed from a rivet storage location, and from which the rivet is inserted into a workpiece by an actuator. The nose assembly includes a central bore through which the rivet and the actuator travel before the rivet is inserted into the workpiece. The nose assembly further includes rivet retention means provided at a bottom end of the central bore, the rivet retention means acting to prevent the rivet from falling out of the nose assembly. The rivet retention means may for example comprise a plurality of balls or rollers which are resiliently biased towards the central bore such that they engage with the rivet when the rivet reaches a bottom end of the nose assembly. In addition to preventing the rivet from falling from the nose assembly, the balls or rollers assist in ensuring that the rivet has a desired orientation and is centralised in the central bore before the rivet is inserted into a workpiece.

Resilient biasing of the balls or rollers towards the central bore of the nose assembly may for example be provided by resilient rubber (or plastic) nose end-blocks located behind the balls or rollers (i.e. on an opposite side from the central bore), or may be provided by a Tensator (trademark) spring which extends around the nose assembly. Examples of both of these arrangements are described in European Patent EP0746431. In other known fastener delivery apparatus the Tensator spring is replaced by an O-ring which resiliently biases the balls towards the central bore in the same way as the Tensator spring.

It is desirable to be able to fasten workpieces together in a variety of different locations. It may for example be desirable to fasten together flanges which project from an object (for example a gutter which projects from a door window of a car) or some other workpiece which is located adjacent to an obstacle. A fastener insertion apparatus may be unable to fasten the workpiece unless the workpiece projects from the obstacle by a distance which is at least equal to (or substantially equal to) the diameter of the nose assembly of the fastener insertion apparatus.

It is desirable to provide a fastener delivery apparatus having a nose assembly which is narrower in at least one direction compared with at least some known prior art fastener delivery apparatus.

SUMMARY OF THE INVENTION

According to a first aspect of the invention there is provided a fastener delivery apparatus comprising a nose assembly configured to releasably hold a fastener; wherein the nose assembly comprises a plurality of balls or rollers and associated biasing members configured to provide a biasing force which biases the balls or rollers such that they engage with the fastener, wherein each biasing member is configured to exert force in a first direction and an associated ball or roller is configured to move in a second direction which is different from the first direction, and wherein a force transfer surface is provided between the ball or roller and the biasing member, the force transfer surface acting to convert at least a component of the force exerted by the biasing member in the first direction into force exerted on the balls or rollers in the second direction.

The fastener delivery apparatus according to the invention is advantageous because the biasing member occupies less space in a radial direction than in prior art fastener delivery apparatus, thereby allowing the nose assembly of the fastener delivery apparatus to be narrower in at least one direction. This allows the fastener delivery apparatus to fasten workpieces such as flanges which project less far from an obstacle than would otherwise be the case.

Using a force translation surface provides the advantage that force exerted by the biasing member is efficiently transferred to the ball or roller which applies force to a fastener in a direction which is substantially transverse to the direction of travel of the fastener. This may allow the orientation of the fastener to be controlled more effectively than if for example the balls or rollers were to apply force to the fastener in a direction which was not substantially transverse to the direction of travel of the fastener.

The second direction may be a substantially orthogonal direction relative a central axis of an actuator of the fastener delivery apparatus. The second direction may intersect with the central axis of the actuator. Alternatively, the second direction may not intersect with the central axis of the actuator.

The second direction may be substantially radial relative to a central axis of an actuator of the fastener insertion apparatus.

The first direction may be substantially parallel to a direction of movement of an actuator of the fastener insertion apparatus.

The biasing member may be a passive biasing member. The passive biasing member may comprise a mechanical spring, a resilient material or a pneumatic spring.

The biasing member may be an active biasing member. The active biasing member may comprise a pneumatic actuator.

The force transfer surface may comprise a sloping surface of a piston which engages with the ball or roller. The sloping surface of the piston may be frustoconical. The sloping surface of the piston may be planar.

The force transfer surface may comprise an intermediate ball located between the biasing member and the ball or roller.

The force transfer surface may be in contact with a plurality of balls.

Two balls may be provided, one on each side of a central bore of the nose assembly. Three or more balls may be distributed around a central bore of the nose assembly. Two balls may be provided adjacent to one another on one side of a central bore of the nose assembly and two balls may be provided adjacent to one another on an opposite side of the central bore of the nose assembly.

Each ball or roller may be one of a set of a plurality of balls or rollers which is provided along a central bore of the nose assembly, a force transfer surface being associated with each ball or roller.

Each force transfer surface may comprise a piston, a first piston being located between the biasing member and a first ball or roller of the set of balls or rollers, and a second piston being located between the first ball or roller and the second ball or roller of the set of balls or rollers.

The ball or roller may be provided in a bore which extends in the second direction, walls of the bore acting to constrain movement of the ball or roller such that the ball or roller moves in the second direction.

A roller may be provided on one side of a central bore of the nose assembly and a roller may be provided on an opposite side of the central bore of the nose assembly.

According to a second aspect of the invention there is provided a method of delivering a fastener to a workpiece comprising moving a fastener through a nose assembly of a fastener insertion apparatus and into the workpiece using an actuator, wherein the orientation of the fastener is controlled at least in part by a plurality of balls or rollers and associated biasing members which provide a biasing force which biases the balls or rollers such that they engage with the fastener, wherein each biasing member exerts force in a first direction and the ball or roller moves in a second direction which is different from the first direction, and wherein a force transfer surface is provided between the ball or roller and the biasing member, the force transfer surface acting to convert at least a component of the force exerted by the biasing member in the first direction into force exerted on the ball or roller in the second direction.

The method may further comprise joining the workpiece by inserting the fastener into it.

According to a third aspect of the invention there is provided a nose assembly configured to releasably hold a fastener; wherein the nose assembly comprises a plurality of balls or rollers and associated biasing members configured to provide a biasing force which biases the balls or rollers such that they engage with the fastener, wherein each biasing member is configured to exert force in a first direction and an associated ball or roller is configured to move in a second direction which is different from the first direction, and wherein a force transfer surface is provided between the ball or roller and the biasing member, the force transfer surface acting to convert at least a component of the force exerted by the biasing member in the first direction into force exerted on the balls or rollers in the second direction.

BRIEF DESCRIPTION OF THE DRAWINGS

Specific embodiments of the present invention will now be described with reference to the accompanying drawings by way of example only, in which.

DETAILED DESCRIPTION

Figure 1:
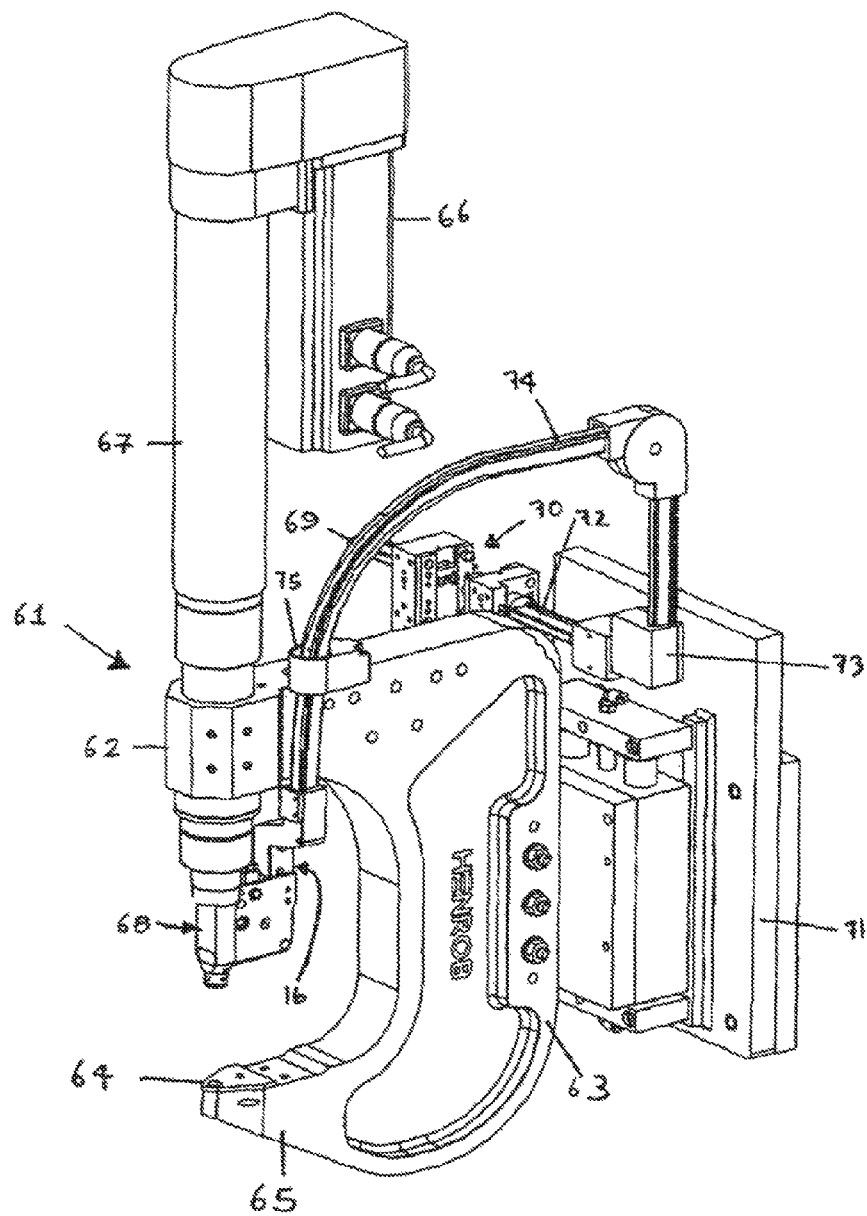
FIG. 1 is a perspective view of a fastener apparatus according to an embodiment of the present invention.

Referring to FIG. 1 of the drawings, a fastener insertion apparatus according to an embodiment of the invention comprises a rivet setting tool 61 that is supported by an upper jaw 62 of a C-frame 63 above a fastener-upsetting die 64 disposed on a lower jaw 65 of the frame. Rivets are inserted by the tool into a workpiece (not shown) supported over the die 64 as is well known in the art.

The setting tool 61 comprises an electric drive 66 (other types of drive such as hydraulic or pneumatic can be used in alternative embodiments of the present invention) that operates to drive a reciprocal actuator (hidden in FIG. 1) in a cylindrical housing 67 and a nose assembly 68 into which rivets are loaded for insertion into the workpiece by the actuator. Rivets are supplied under air or gas pressure from a bulk feeder (not shown) via a first delivery tube 69 that is releasably connectable to the insertion apparatus via a docking station 70. One half of the docking station 70 is connected to the end of the first delivery tube 69 and the other half, being supported on a robot mounting plate 71, is connected to the inlet of a buffer magazine 72. Supplied rivets are intermittently loaded into the buffer magazine 72 and then fed individually to the setting tool 61 via an escapement mechanism 73 and a second (flexible) supply tube 74. A ring proximity sensor 75 detects the passage of a rivet in the tube 74. The rivets are delivered to the actuator via a nose assembly feeder assembly 76 (mostly hidden in the view of FIG. 1) that is mounted immediately adjacent to the nose assembly 68. The present invention is concerned with the configuration of the nose assembly 68.

The embodiment of the invention shown in FIG. 1 supplies rivets to the nose assembly 68 via a first delivery tube 69 using air or gas pressure. In an alternative embodiment, shown in FIG. 2, rivets 21 are delivered to the nose assembly 68 using a web 78. The web 78 may for example be formed from plastic, and may include flanges 79 which may assist in providing stability to the web 78 and may assist guiding the web 78 through a section 80 which is cut into the nose assembly 68. A housing of the nose assembly 68 is omitted from FIG. 2 so that an actuator 20 may be seen. The actuator 20 is used to drive rivets 21 through the nose assembly 68 and insert them into a workpiece.

In use, the web 78 is moved through the section 80 until a rivet 21 is located beneath the actuator 20. The actuator 20 is then moved downwards through web 78, thereby pushing the rivet 21 from the web and into a central bore within the nose assembly. The rivet is held in a desired orientation by balls or rollers (as described further below) at a bottom end of the nose assembly 68. The actuator 20 pushes the rivet from the nose assembly 68 into a workpiece (not shown), and is then withdrawn from the nose assembly and the web 78. The web 78 is then moved until a new rivet 21 is located beneath the actuator 20, whereupon operation of the apparatus is repeated.

Figure 2:
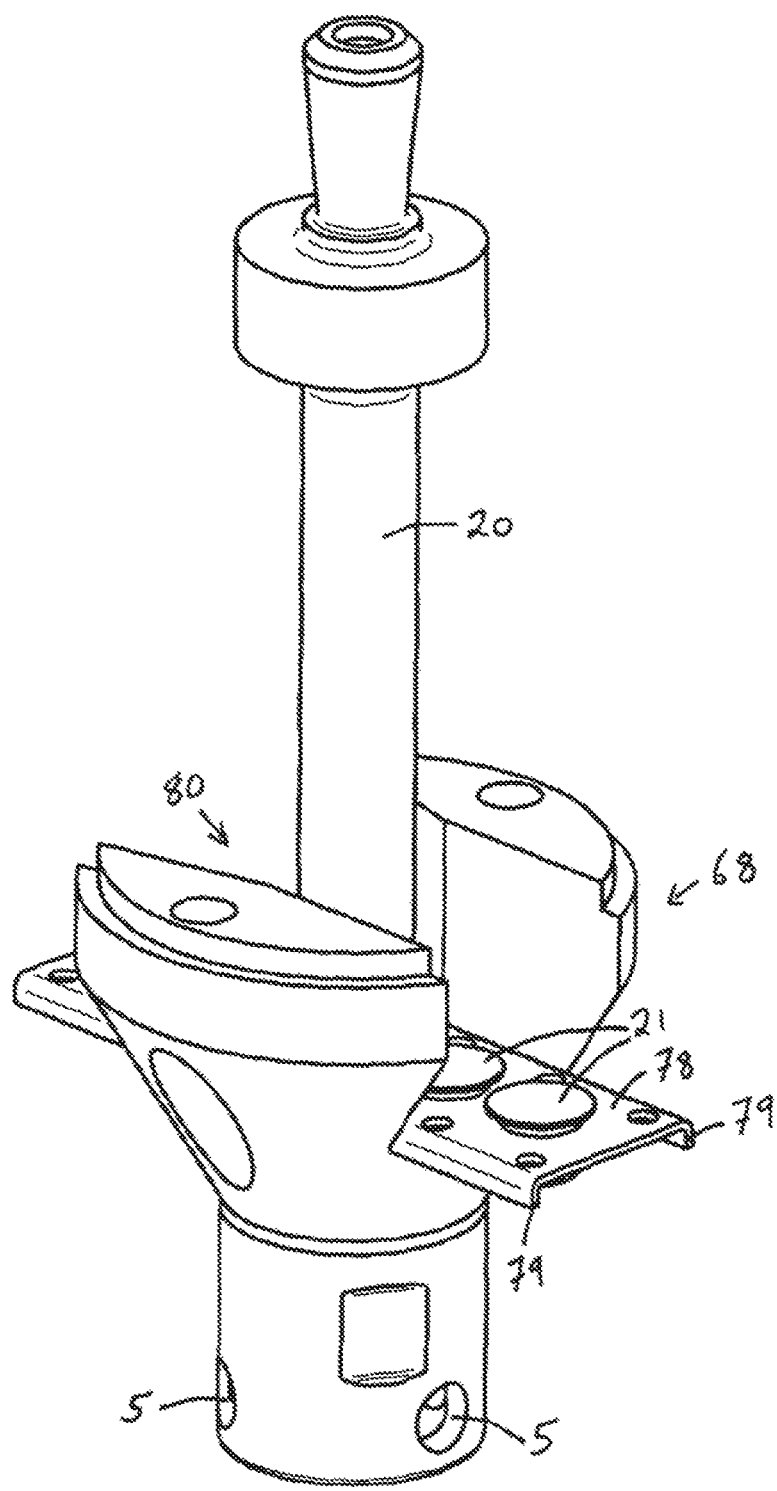
FIG. 2 is a perspective view of a nose assembly of a fastener apparatus according to an alternative embodiment of the present invention.

The nose assembly 68 shown in FIG. 2 includes three bores 5 (only two of which are visible) within which balls (not shown) are held. The balls are resiliently biased against a rivet held in the nose assembly 68 as is explained below.

Figure 3:
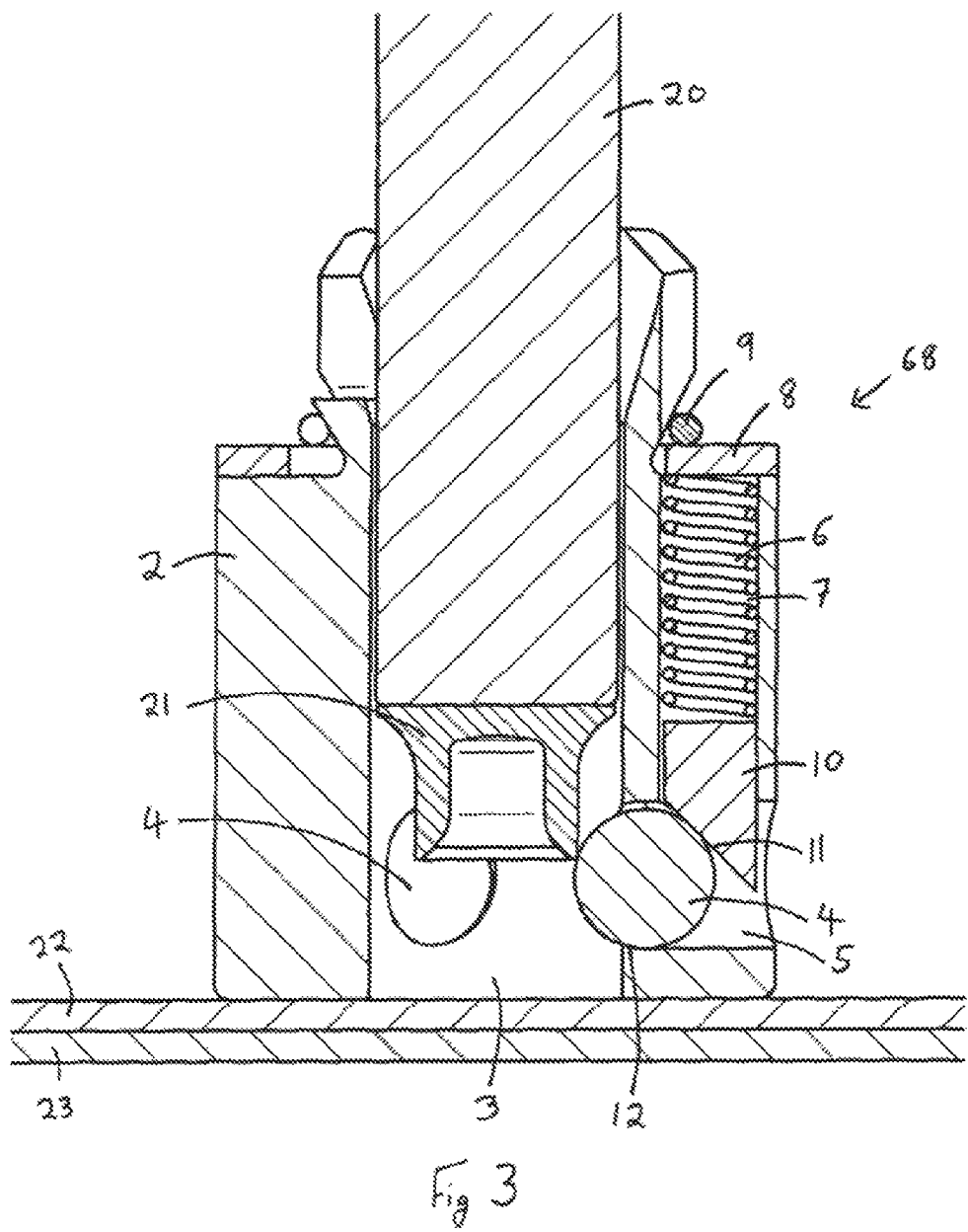
FIGS. 3 and 4 are cross-sectional views of the nose assembly of FIG. 2.

FIG. 3 shows in cross-section part of a nose assembly 68 of a fastener insertion apparatus according to an embodiment of the invention. The nose assembly is configured to releasably hold a fastener, and comprises a nose end-block 2 through which a cylindrical central bore 3 has been provided. The nose assembly 68 further comprises a plurality of balls 4 which are provided in bores 5 that extend radially from the central bore 3. In this context the term 'radially' may be interpreted as meaning radial relative to a central axis of the actuator 20. Although only two balls 4 and two radially extending bores 5 are visible in FIG. 3, the embodiment of FIG. 3 includes three balls, each of which is provided in a separate radially extending bore. A spring 6 is located in an axially extending bore 7 which connects with one of the radially extending bores 5. In this context the term 'axially' may be interpreted as meaning parallel to the direction of movement of the actuator 20. An upper end of the axially extending bore 7 is closed by a removable lid 8 which extends annularly around the nose end-block 2 and is held in place by a circular clip 9. An upper end of the spring 6 abuts against the lid 8. A piston 10 is provided at an opposite end of the spring 6 and abuts against the spring. The piston 10 is partially contained within the axially extending bore 7, but part of the piston 10 projects from a lower end of the axially extending bore into the radially extending bore 5. The piston 10 is provided with a sloping lowermost surface which extends at an angle of approximately 45° relative to the axial direction. Although the sloping surface 11 subtends an angle of around 45° relative to the axial direction, the sloping surface may subtend any other suitable angle. The sloping surface may be considered to be an example of a force transfer surface. Although only one spring 6, piston 10 and axially extending bore 7 is shown in FIG. 3, three springs, pistons and axially extending bores are provided (one being provided for each ball 4).

An actuator 20 and a rivet 21 are also shown in FIG. 3. The actuator 20 is cylindrical, and the actuator is received in the central bore 3 of the nose assembly 68. A bottom end of the actuator 20 is in contact with an uppermost end of the rivet 21. Two sheets of material 22, 23 are shown in FIG. 3 (these may be considered to be an example of a workpiece). The sheets of material 22, 23 are secured between a lowermost surface of the nose end-block 2 and an uppermost surface of a fastener-upsetting die (not shown).

The actuator 20 is moveable in the vertical direction, and may be removed from the central bore 3 in order to allow a rivet 21 to enter the cylindrical bore. When a rivet 21 is introduced into the cylindrical bore, it travels downwards within the cylindrical bore until it comes into contact with the balls 4.

When the rivet 21 and actuator 20 are not present in the central bore 3, the springs 6 and pistons 10 act to push the balls 4 in an inward radial direction. The radial bores 5 include an inner portion 12 with a reducing diameter, the reduction being sufficient that the diameter of an inner end of each radial bore 5 is less than the diameter of the balls 4. The balls 4 are therefore prevented from being pushed out of the radial bores 5 by the springs 6 and pistons 10. Instead, the balls 4 project into the central bore 3 in the manner shown in FIG. 3.

In use, the actuator 20 is removed from the central bore 3 in order to allow a rivet 21 to pass into the cylindrical bore. The rivet 21 travels along the central bore 3 (for example due to gravity or due to force exerted by the actuator) until it rests upon the balls 4. The balls 4 act as rivet retention means which prevent the rivet from falling out of the central bore 3. The weight of the rivet 21 is sufficiently low that the rivet does not cause significant movement of the balls 4 in the outward radial direction and thus does not cause significant compression of the springs 6.

The actuator 20 is reintroduced into the central bore 3 after the rivet has been delivered into it. A bottom end of the actuator 20 comes into contact with an uppermost end of the rivet 21 as shown in FIG. 3. The actuator 20 and the balls 4 act together to ensure that the rivet 21 has the correct orientation to allow the rivet to be inserted into the sheets of material 22, 23 (thereby fastening the sheets of material together).

As the actuator 20 travels downwards the rivet 21 pushes the balls 4 radially outwards (into the radial bores 5). The springs 6 resiliently bias the balls 4 against the rivet 21, thereby helping to ensure that the rivet retains the correct orientation during downward movement of the actuator 20 and rivet. The springs 6 exert force in the downward direction, a component of which is converted by the sloping surfaces 11 into force which is exerted on the balls 4 in the radial direction. The balls 4 are constrained by the radial bores 5 to move in the radial direction, and they exert force against the rivet 21 in the radial direction. The balls 4 thus grip the rivet 21 and help to ensure that the rivet retains the correct orientation.

Figure 4:
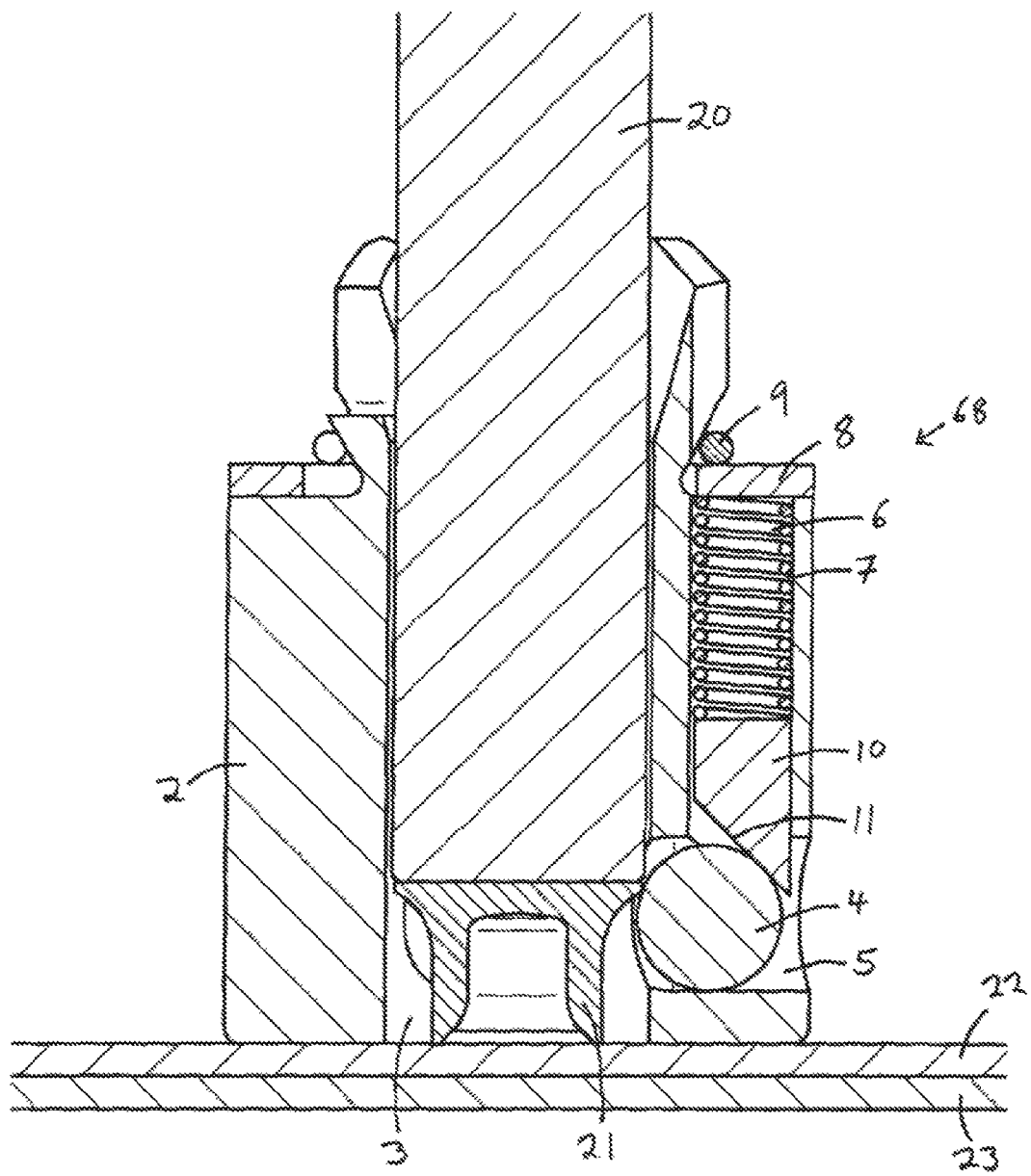

Referring to FIG. 4, as the actuator 20 moves further down into the central bore 3, the outwardly tapering upper surface of the rivet 21 pushes the balls 4 further into the radial bores 5, thereby causing further compression of the springs 6 via the pistons 10 and sloping surfaces 11. The balls 4 continue to assist in ensuring that the rivet 21 retains the correct orientation (i.e. the orientation shown in FIG. 4) as the rivet enters the upper sheet of material 22.

Continued downward movement of the actuator 20 causes the rivet to pass from the central bore 3 into the sheets of material 22, 23, thereby fastening the sheets of material together. In doing so the actuator 20 pushes the balls 4 into the radial bores 5 so that the balls 4 do not impede movement of the actuator. Once the rivet 21 has passed into the sheets of material 22, 23 the actuator 20 is withdrawn from the central bore 3 in order to allow a new rivet to pass into the cylindrical bore. Withdrawal of the actuator 20 from the central bore 3 allows the balls 4 to travel radially inwardly under the bias provided by the pistons 10 and springs 6. The balls 4 thus return to the positions shown in FIG. 3.

Providing the springs 6 in axially extending bores 7 instead of providing the springs in radially extending bores (as is done in the prior art) is advantageous because it allows the diameter of the nose end-block 2 to be reduced. This allows the fastener insertion apparatus to insert a fastener into a workpiece at a location which is closer to an obstacle than would be possible using a fastener insertion apparatus having a conventional nose end-block (e.g. allowing the apparatus to insert a fastener into a narrower flange). A fastener insertion apparatus which embodies the invention may thus allow rivets to be used to provide fastening in locations and on flanges or surfaces which could not be fastened using a conventional fastener insertion apparatus.

Although the illustrated embodiment of the invention is provided with three balls 4, four balls, five balls, or any other suitable number of balls may be provided. Each ball may be provided in a separate radial bore. Alternatively, two or more balls may be provided within a single radial bore. An embodiment of the invention in which two balls are provided in each radial bore is show in FIGS. 5-7. Some features of the nose assembly shown in FIGS. 5-7 correspond with those described above in relation to FIGS. 3 and 4. Where this is the case the features are provided with the same reference numerals.

Figure 5:
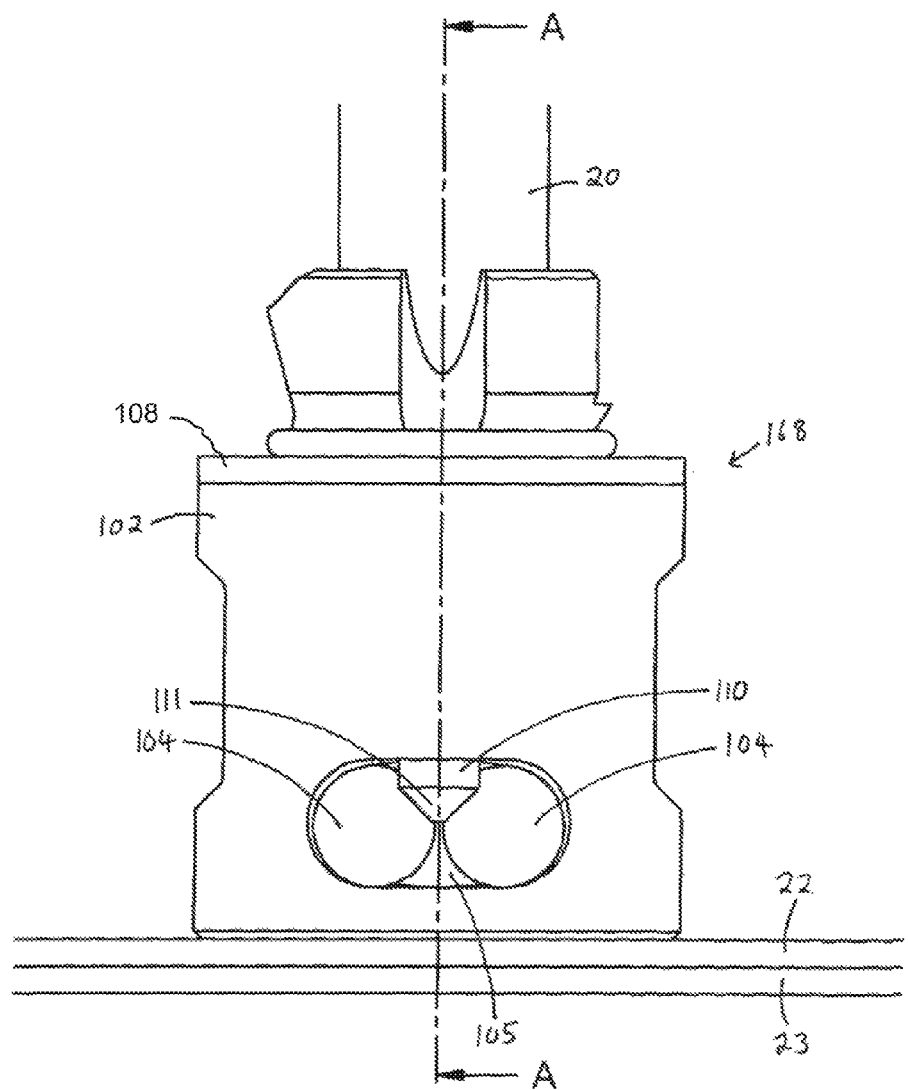
FIGS. 5-7 are views of a nose assembly of a fastener apparatus according to an alternative embodiment of the invention.

FIG. 5 shows viewed from one side a nose assembly 168 of a fastener insertion apparatus according to an embodiment of the invention. An actuator 20 extends from an upper end of the nose assembly 168, and two sheets of material 22, 23 are located beneath the nose assembly 168. The nose assembly comprises a nose end-block 102 within which a radially extending bore 105 is provided. The radially extending bore 105 is not cylindrical but instead has an elongate shape comprising substantially horizontal upper and lower surfaces and substantially hemispherical sides. Two balls 104 are located within the radial bore 105. The balls are prevented from rolling out of a radially inner end of the radial bore 105 because the inner end of the radial bore has a reduced height, the reduced height of the radial bore being less than the diameter of the balls. A piston 110 extends downwardly into the radial bore 105. The piston 110 is located behind the balls 104 (relative to a central bore of the nose end-block 102) and is positioned between the balls such that it is in contact with both of them. The piston 110 resiliently biases the balls 104 towards the inner end of the radial bore. A bottom end of the piston 110 is frustoconical in shape and thus provides a sloping surface 111 which contacts the balls 104. The sloping surface 111 may be considered to be an example of a force transfer surface. The sloping surface 111 may subtend any suitable angle.

Figure 6:
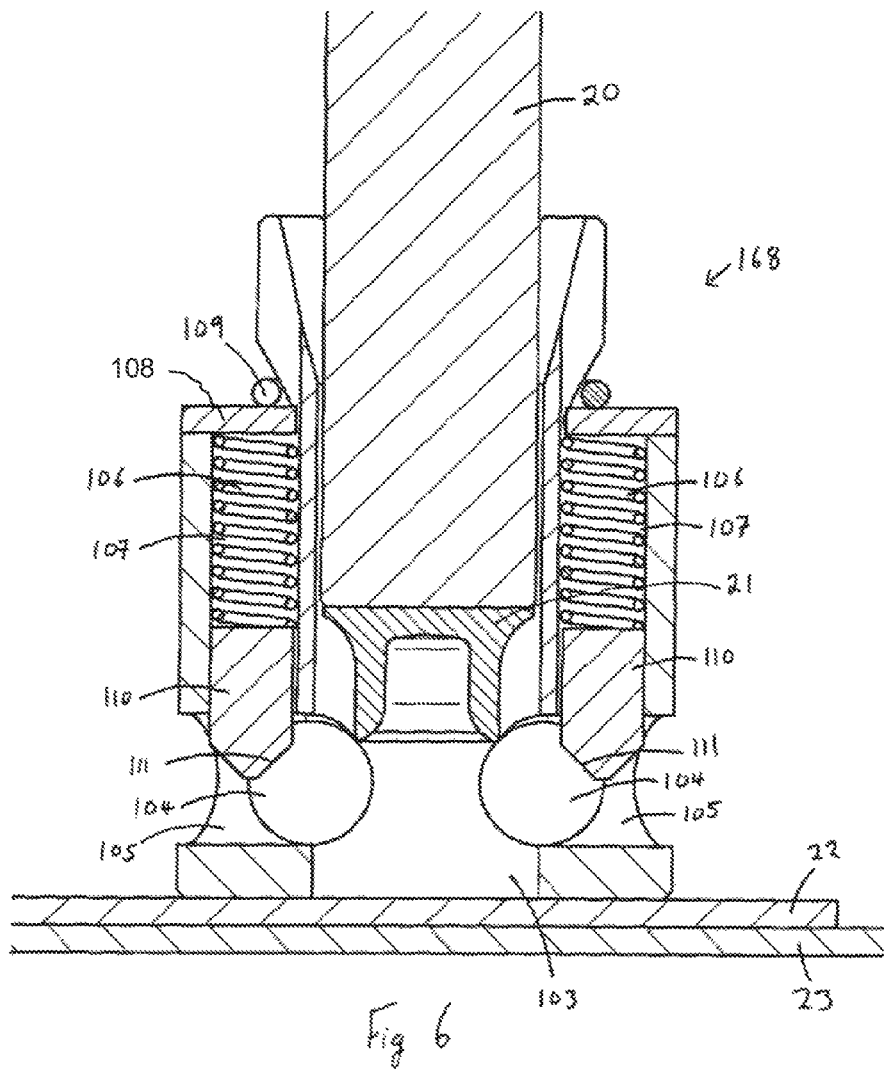

FIG. 6 shows the nose assembly 168 viewed in cross-section along the dotted line AA indicated in FIG. 5. From FIG. 6 it may be seen that the piston 110 is one of a pair of pistons, each of which is provided in an axially extending bore 107. A spring 106 is located in each axially extending bore 107, an upper end of the spring abutting against a removable lid 108 which extends around the nose end-block 102. The removable lid 108 is held in place by a circular clip 109. A bottom end of each spring 106 abuts against an upper surface of the piston 110. The spring 106 resiliently biases the piston 110 downwards. The sloping surfaces 111 of the pistons 110 convert a component of downward force exerted by the pistons to force exerted radially inwardly on the balls 104 (i.e. towards the central bore 103). The radial bores 105 constrain movement of the balls 104, thereby ensuring that the balls move towards the central bore 103 rather than moving in some other undesired direction. The springs 106 together with the radial bores 105 thus together resiliently bias the balls 104 against a rivet 21 located in the central bore 105 (the balls exert force against the rivet in a substantially radial direction).

In use, the actuator 20 is withdrawn from the nose assembly 68 in order to allow a rivet 21 to be inserted into the central bore 3. The springs 106, together with sloping surfaces 111 of the pistons 110, push the balls 104 radially inwardly such that they project into the central bore. A rivet 21 is introduced into the central bore 3 and travels downwards in the cylindrical bore until it meets the balls 104. The actuator 20 is reintroduced into the cylindrical bore 3 and moved downwards until a bottom end of the actuator is in contact with an uppermost end of the rivet 21 (as shown in FIG. 6). The balls 104 together with the actuator 20 act to control the orientation of the rivet 21 so that the rivet has the correct orientation for insertion into the sheets of material 22, 23.

Figure 7:
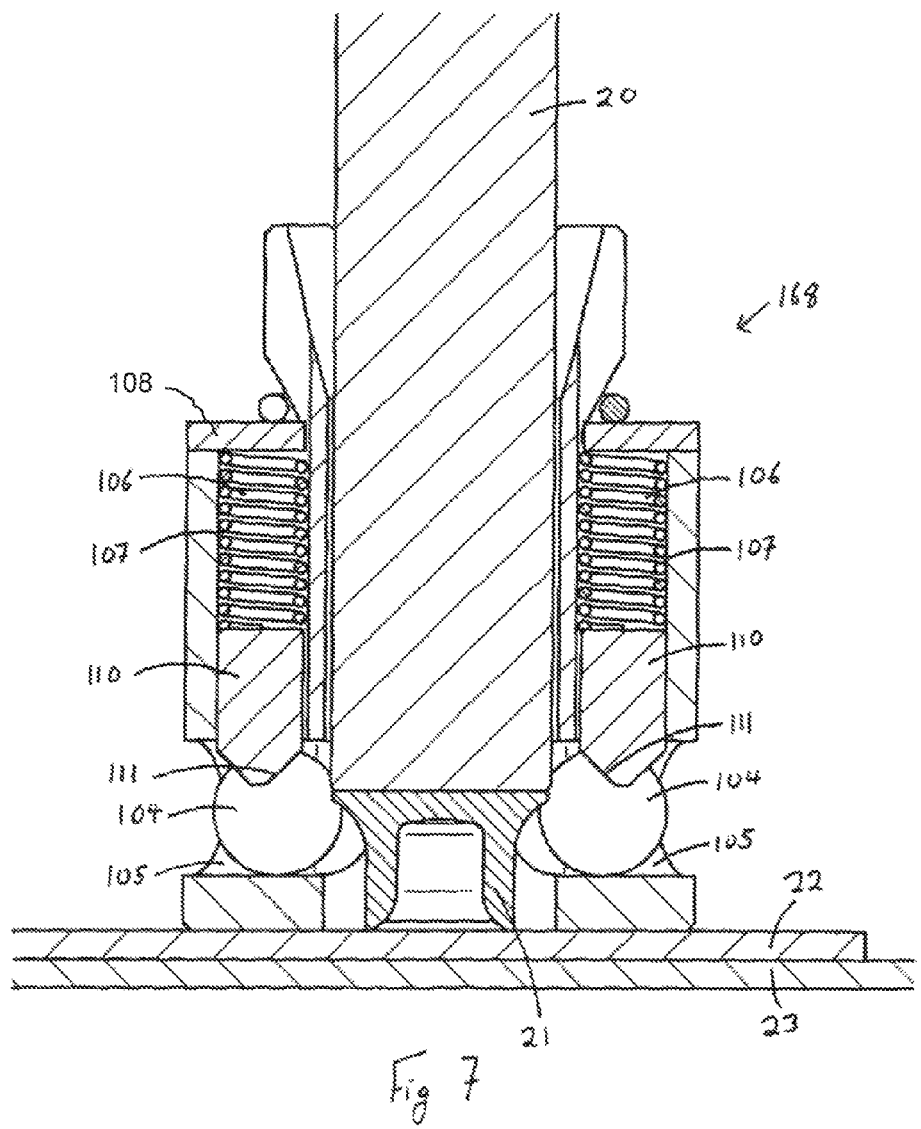

Referring to FIG. 7, the actuator 20 moves downwards and pushes the rivet 21 downwards. The rivet 21 pushes the balls 104 radially outwardly as it travels downwards in the central bore 3. The resilient bias provided by the springs 106 pushes the balls 104 against the rivet 21, thereby keeping the rivet in the desired orientation. As the rivet travels further downwards, the outwardly tapering shape of the head of the rivet 21 pushes the balls 104 further radially outwards. The resilient bias provided by the springs 106 continues to help to maintain the rivet 21 in the desired orientation. The rivet 21 is pushed by the actuator 20 out of the central bore 3 and into the sheets of material 22, 23, thereby fastening the sheets of material together. The balls 104 are pushed radially outwards by the actuator 20 such that the balls do not restrict movement of the actuator.

Once the rivet has been delivered from the nose assembly 168, the actuator 20 is withdrawn from the nose assembly to allow a new rivet to be introduced into the central bore 3. When the actuator 20 is removed from the central bore 3 the balls 104 are free to move radially inwards under the resilient bias of the spring 106 to the positions shown in FIG. 6.

Figure 8:
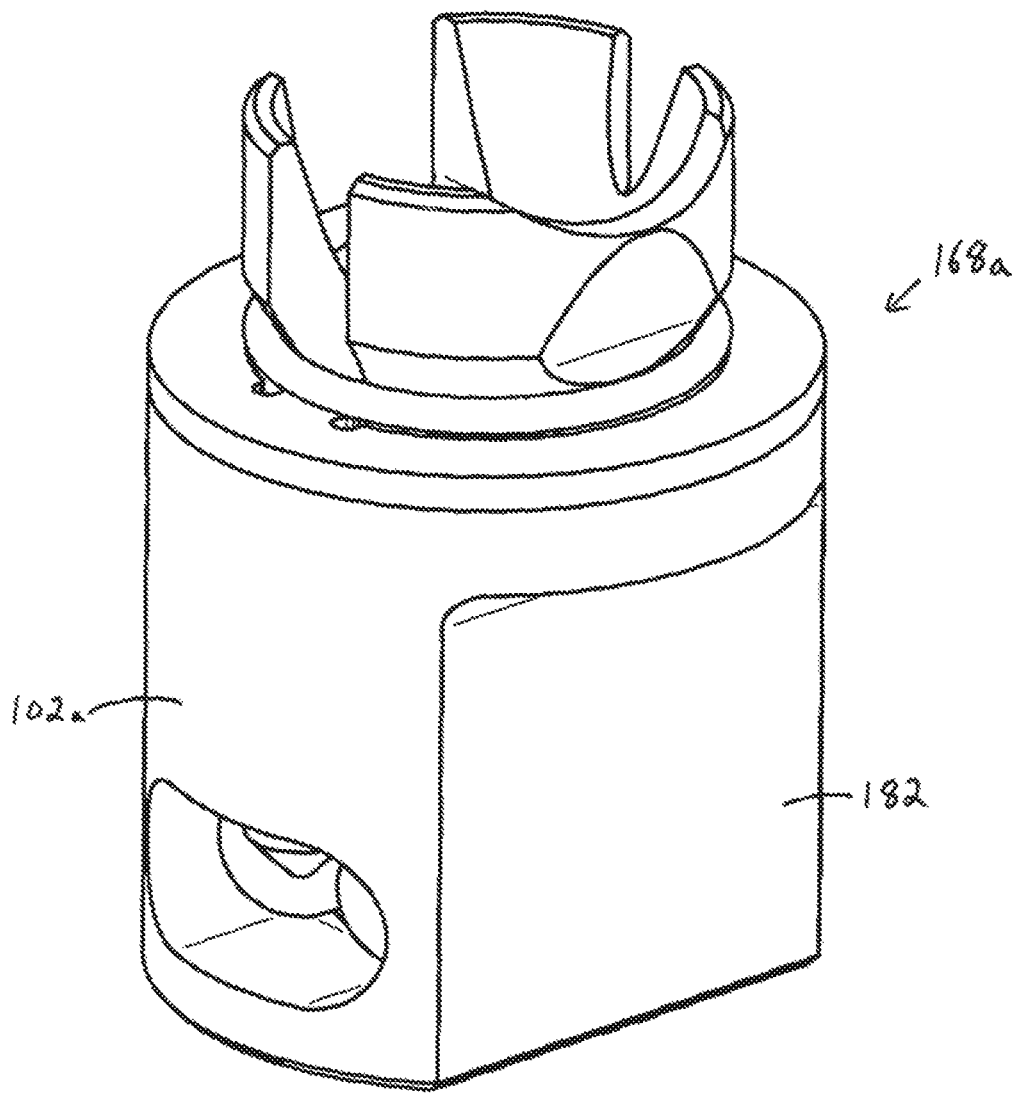
FIG. 8 is a perspective view of a nose assembly of a fastener apparatus according to a further alternative embodiment of the invention

An advantage of the embodiment of the invention shown in FIGS. 5-7 is that balls 104 are only provided on two sides of the nose assembly 168 and the nose assembly may be made narrower in locations where no balls are present. The nose assembly 168 may for example have a reduced diameter in a radial direction which is transverse to the direction of movement of the balls 104 (compared for example with the embodiment shown in FIGS. 3 and 4). FIG. 8 shows an example of a nose assembly 168a which comprises two pairs of balls arranged as described above in relation to FIGS. 5-7, and which has a reduced diameter. The nose assembly 168a comprises a nose end-block 102a which is provided with flat sides 182 (only one of which is visible in FIG. 8). The flat sides 182 may allow the nose assembly 168a to provide fastening at a location which is closer to an obstacle than would be the case if the nose assembly had a cylindrical perimeter. In an alternative arrangement, instead of having two flats sides 182 the nose assembly 168a may have only one flat side.

Figure 9:
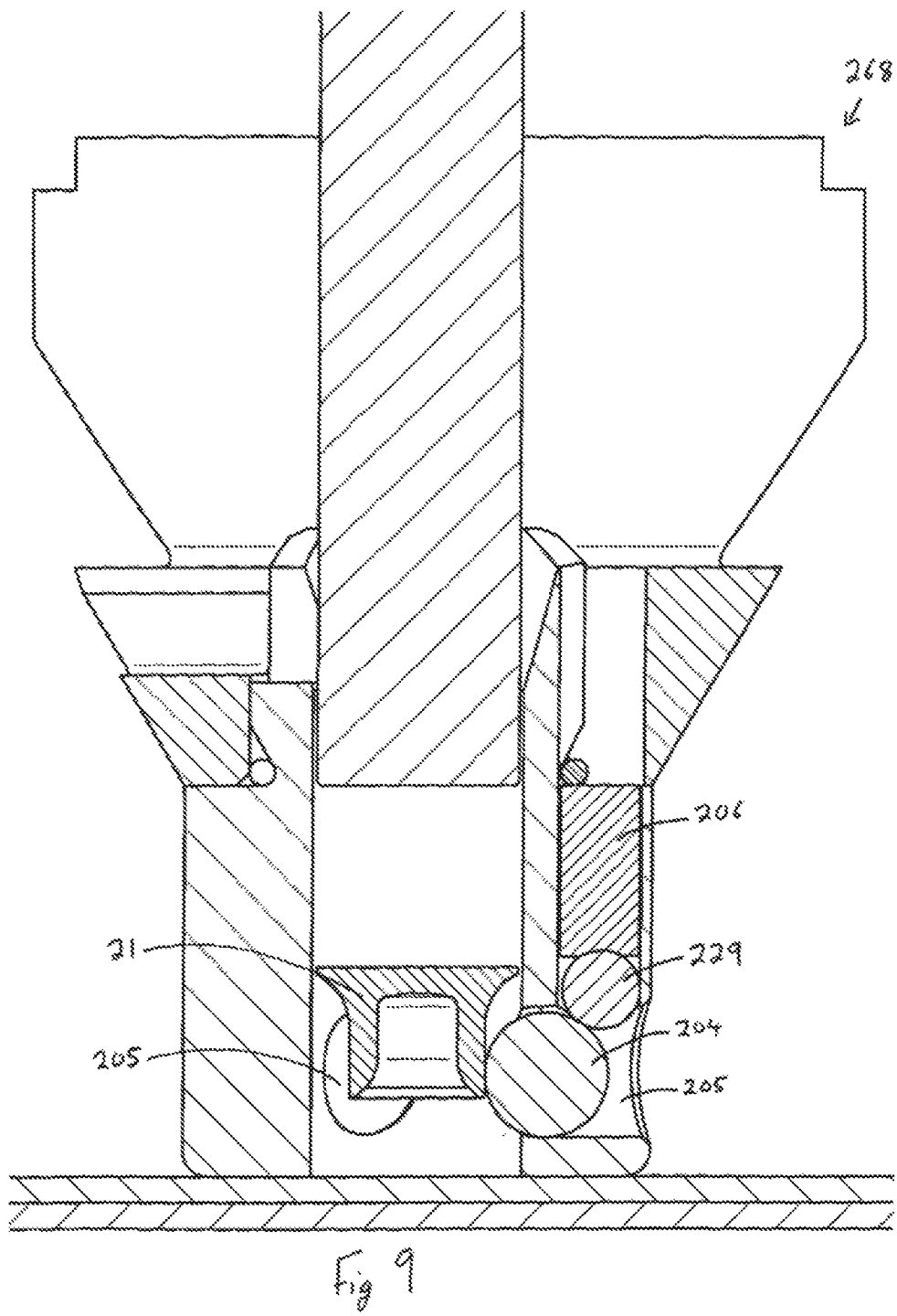
FIG. 9 is a cross-sectional view of a nose assembly of a fastener apparatus according to a further alternative embodiment of the invention.

A further alternative embodiment of the invention is shown schematically in FIG. 9. In common with the embodiment shown in FIGS. 3 and 4, a nose assembly 268 is provided with three radial extending bores 205, each of which contains a ball 204 that is biased radially inwards and acts to keep a rivet 21 in a desired orientation. A piston with a sloping surface to convert axial movement of a spring into radial movement of the balls is not provided. Instead, additional balls 229 (referred to hereafter as intermediate balls) are provided between the balls 204 and a biasing member 206 formed from a resilient material such as rubber or plastic. The intermediate balls 229 are resiliently biased downwardly by the biasing member 206. The spherical surfaces of the intermediate balls 229 and of the radially movable balls 204 converts this downward movement into radially inward movement of the balls 204. The balls 204 are thus biased against the rivet 21 and hold the rivet in the desired orientation. Operation of the nose assembly 268 shown in FIG. 9 is analogous to operation of the nose assembly 68 shown in FIGS. 3 and 4. The rivet 21 shown in FIG. 9 has been pushed by the actuator 20 to a position in which the rivet is fully engaged by the balls 204 (i.e. the balls 204 are pressing against a stem of the rivet). The balls 204 will continue to press against the rivet 21 until the rivet moves beyond the balls.

Figure 10:
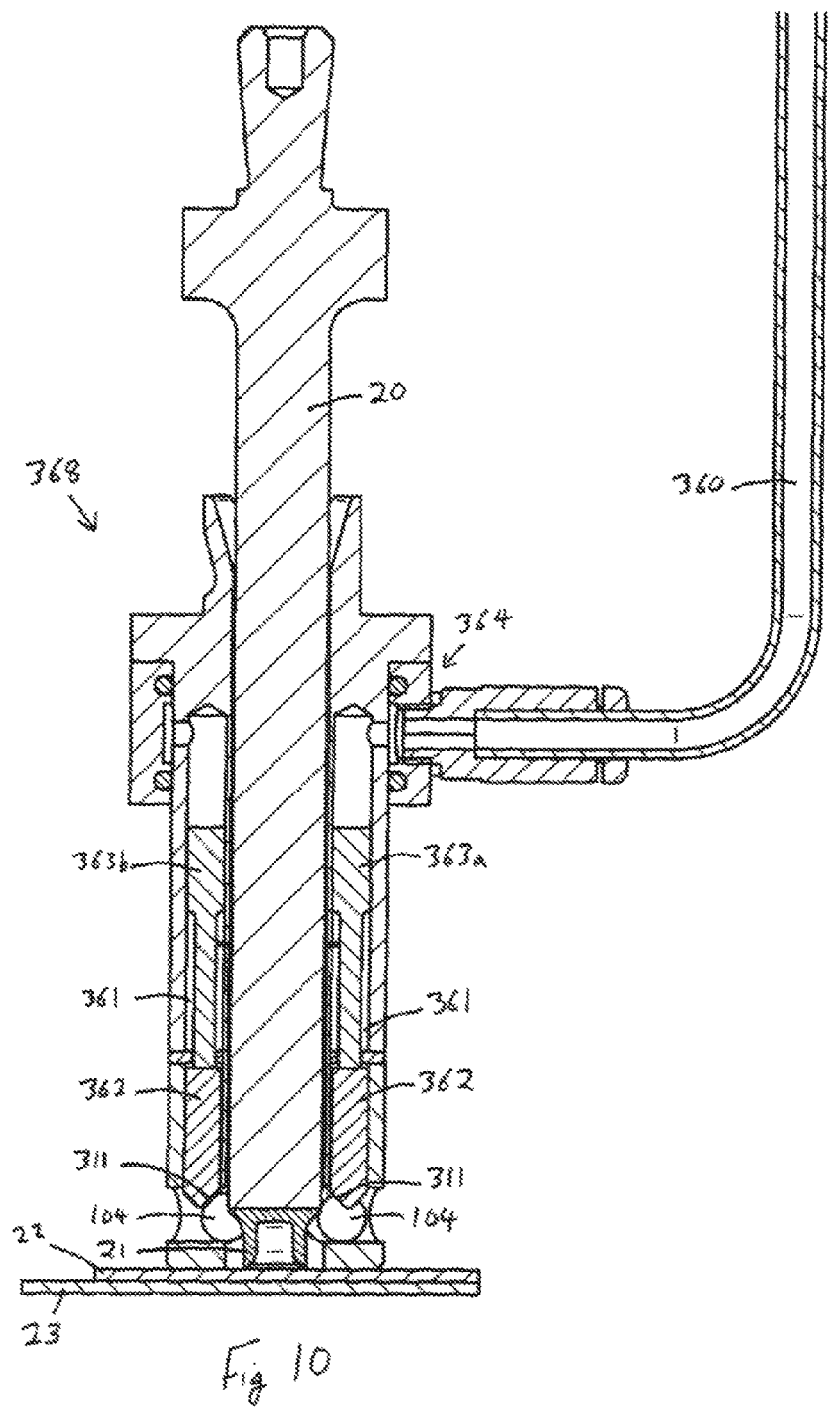
FIG. 10 is a cross-sectional view of a nose assembly and pneumatic line of a fastener apparatus according to a further alternative embodiment of the invention.

FIG. 10 shows in cross-section a nose assembly 368 according to a further alternative embodiment of the invention. Also shown in FIG. 10 is a pneumatic line 360 which connects a source of pneumatic pressure to the nose assembly 368. The nose assembly 368 corresponds generally with the nose assembly shown in FIGS. 5-7, and corresponding reference numerals are used for features which correspond with those shown in those figures. An actuator 20 is used to push a rivet 21 into sheets of material 22, 23. Balls 104 are resiliently biased against the rivet 21, thereby maintaining the rivet in a desired orientation to allow the rivet to be inserted into the sheets of material 22, 23. Axial bores 361 are provided in the nose assembly 368, the axial bores being longer than the axial bores of the embodiment shown in FIGS. 5-7. Pistons 362 are provided in the axial bores 361, the pistons acting via sloping surfaces 311 to resiliently bias the balls 104 radially inward. Pneumatic actuators 363a,b are provided in the axial bores 361 and provide an equivalent function to the springs 106 shown in FIGS. 5-7 (they are biasing members). The right hand pneumatic actuator 363a is connected via a pneumatic connection 364 to the pneumatic line 360. The pneumatic line 360 any also be connected the left hand pneumatic actuator 363b, for example via a channel which passes around the nose assembly 368. Alternatively, a separate pneumatic line (not shown) may be connected via a separate pneumatic connection to the left hand pneumatic actuator 363b.

Operation of the apparatus shown in FIG. 10 is similar to operation of the apparatus shown in FIGS. 5-7. However, the pneumatic actuators 363 provide the advantage that the force which they apply to the pistons 362 maybe actively controlled (unlike the springs 106 shown in FIGS. 5-7) by controlling the pressure provided via the pneumatic line 360. The pressure supplied to the pneumatic actuators 363 may for example be reduced whilst the head of the rivet 21 is travelling past the balls 104. This is advantageous because it reduces the force which is applied by the balls 104 to the head of the rivet 21, thereby reducing the likelihood that the balls cause damage to the head of the rivet. The pressure supplied to the pneumatic actuators 363 may for example be controlled by a controller (not shown).

Figure 11:
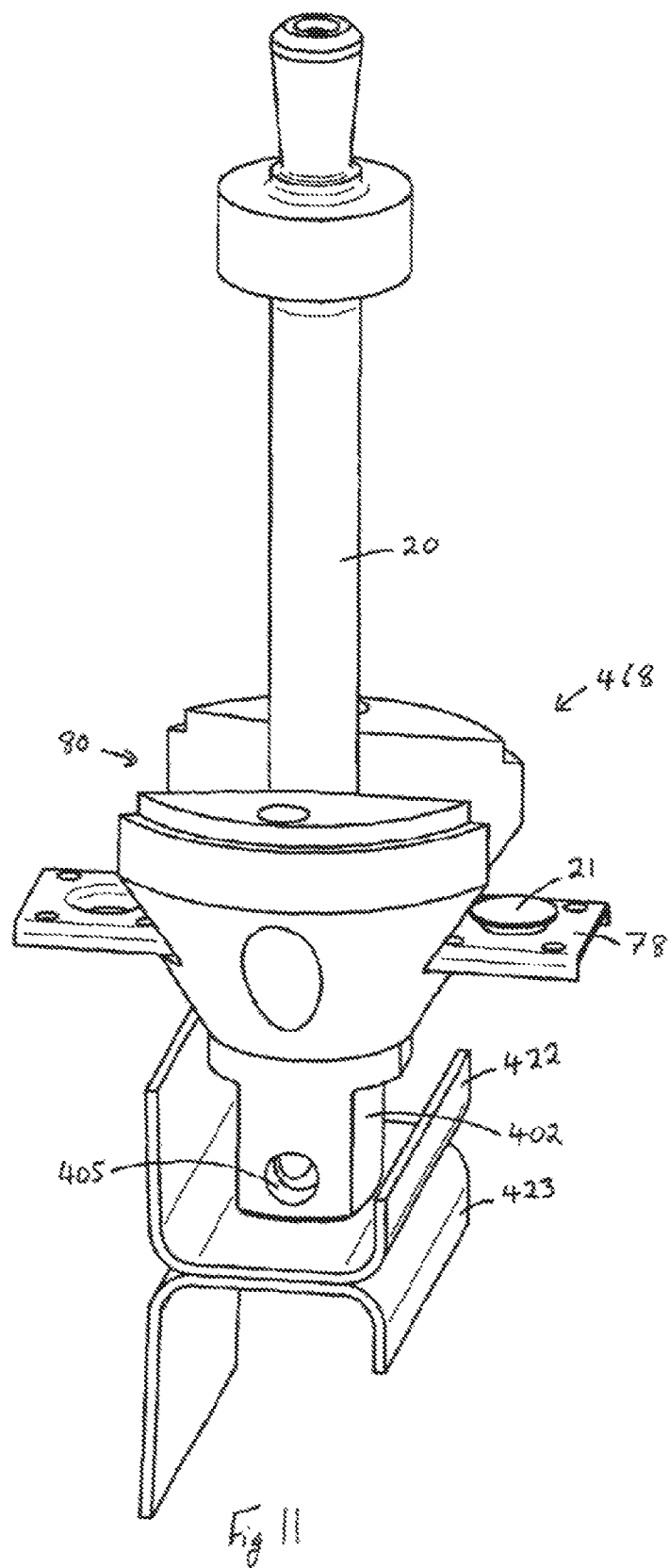
FIG. 11 is a perspective view of a nose assembly of a fastener apparatus according to a further alternative embodiment of the invention.

FIG. 11 is a perspective view of a nose assembly 468 according to a further alternative embodiment of the invention. Also shown in FIG. 11 is an actuator 20 and a web 78 which hold rivets 21 and which passes through a section 80 which is cut into the nose assembly 468, thereby delivering rivets to the nose assembly. A workpiece comprising a U-shaped flange 422 and an inverted U-shaped flange 423 is also shown in FIG. 11. The nose assembly 468 comprises two balls (not shown) which are located in bores 405. The bores 405 are provided on opposite sides of the nose assembly 468, and consequently only one bore 405 is visible in FIG. 11.

Figure 12:
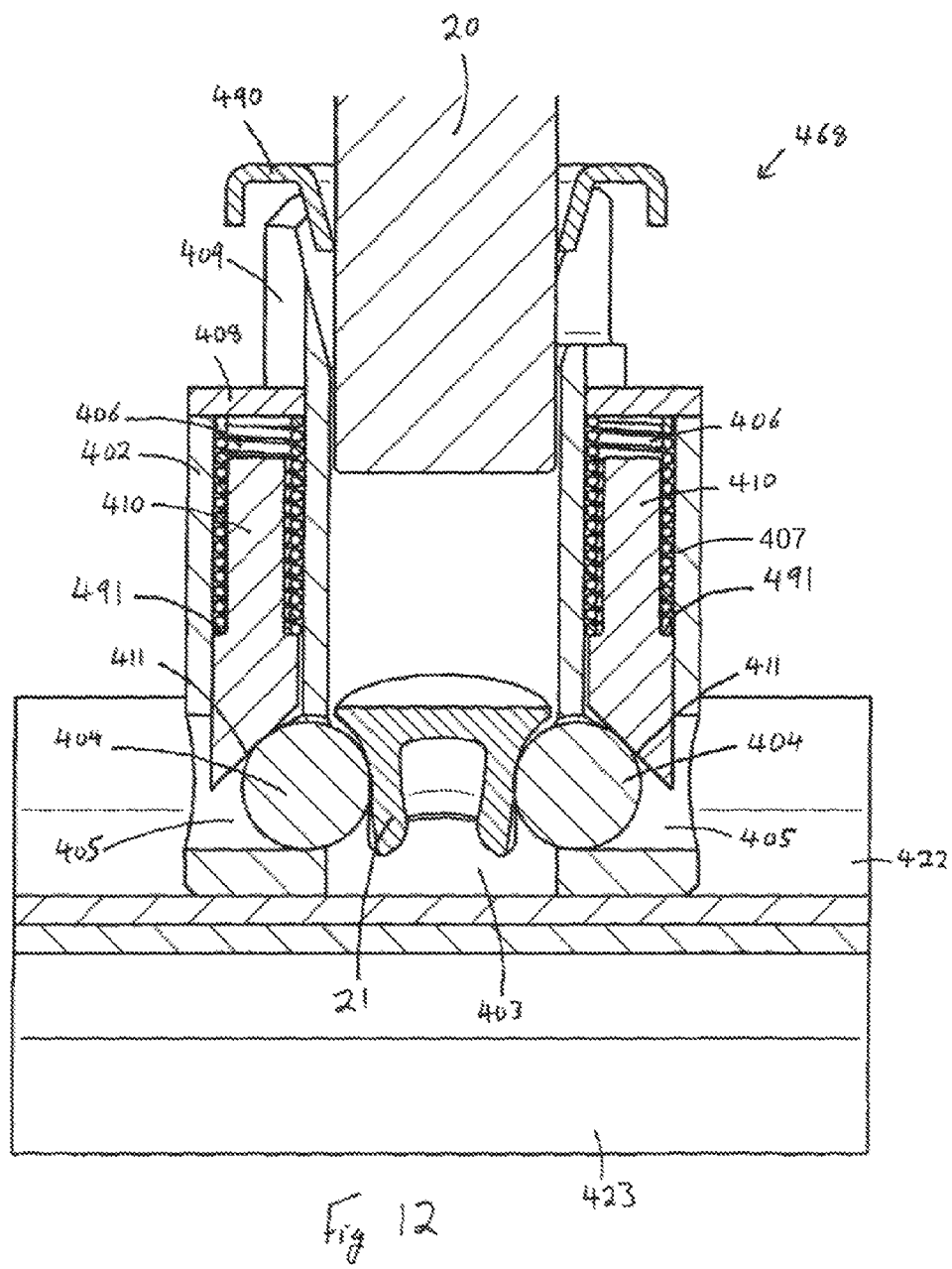
FIGS. 12 and 13 are cross-sectional views of the nose assembly shown in FIG. 12.

FIG. 12 shows the nose assembly 468 in cross-section, the cross-section being selected such that both balls 404 and bores 405 are visible. It may be seen from FIG. 12 that the bores 405 extend radially from a central bore 403 of the nose assembly 468. Springs 406 are located in axially extending bores 407, each of which connects with a radially extending bore 405. In this context the term 'axially' may be interpreted as meaning parallel to the direction of movement of the actuator 20. An upper end of each axially extending bore 407 is closed by a removable lid 408 which extends annularly around a nose end-block 402 of the nose assembly 468. The removable lid 408 is held in place by a cylindrical tube 409 and a substantially annular clip 490. An upper end of each spring 406 abuts against the lid 408. A piston 410 is partially contained within each axially extending bore 407, with part of each piston 410 projecting from a lower end of the axially extending bore into the radially extending bore 405. An upper end of each piston 410 extends part way into each spring 406. A lower end of each spring 406 presses against a lip 491 which is located part way down each piston 410 and which defines the beginning of a portion of the piston which has an increased diameter (compared with the portion which extends into the spring). Each piston 410 is provided with a sloping lowermost surface which extends at an angle of approximately 45° relative to the axial direction. Although the sloping surface 411 subtends an angle of around 45° relative to the axial direction, the sloping surface may subtend any other suitable angle. The sloping surface may be considered to be an example of a force transfer surface.

Figure 13:
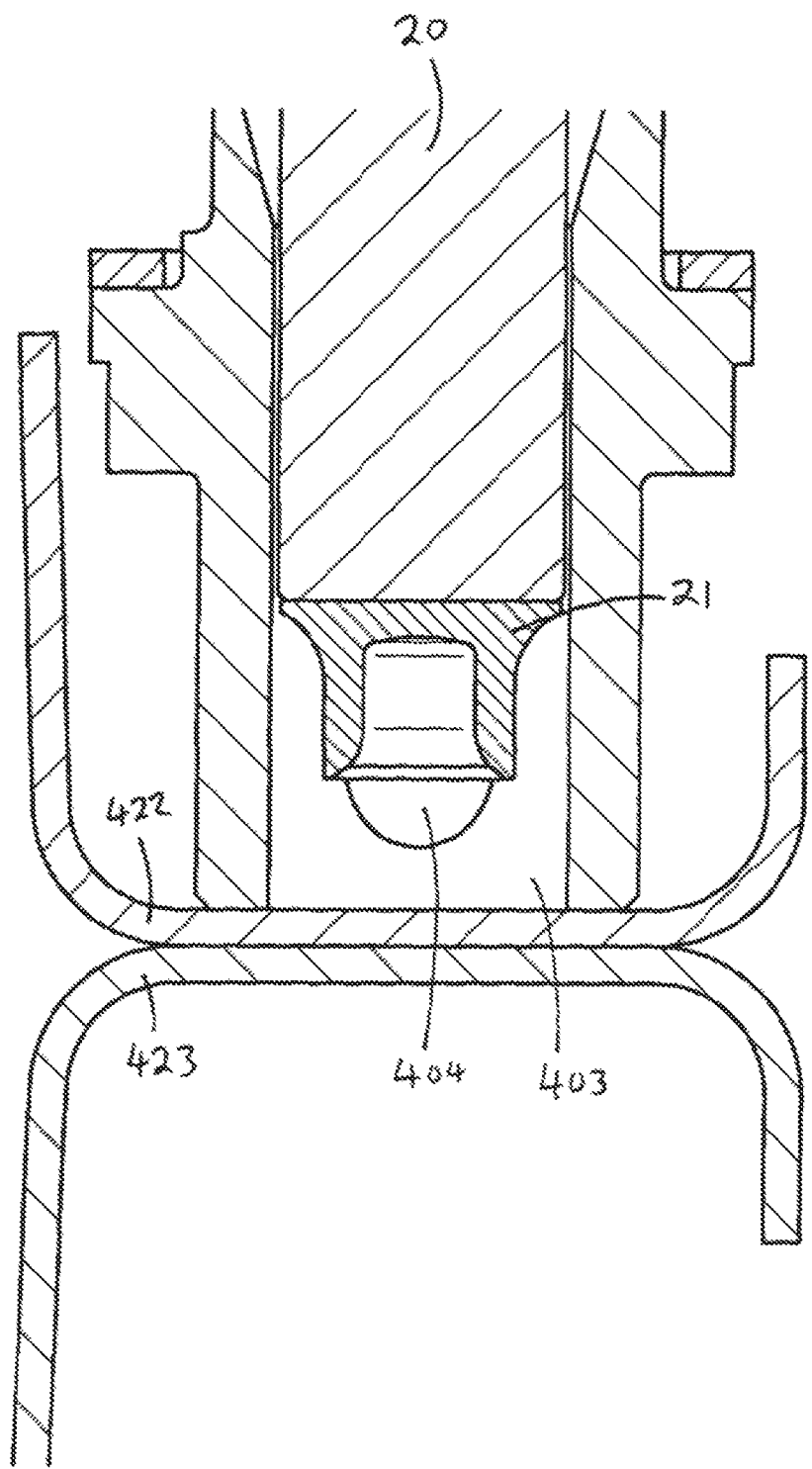

In use, in common with embodiments described further above, the springs 406 and pistons 410 act to push the balls 404 in an inward radial direction. The balls are thereby resiliently biased against a rivet 21 in the central bore 403. Since only two balls 404 are provided, the orientation correction provided by the balls may be less than that provided by a nose assembly in which three or more balls are provided. For example, the balls 404 may provide limited rivet orientation control about a rotational axis which passes horizontally through the rivet 21 and lies in the plane of FIG. 12. Control of the orientation of the rivet 21 about this axis may be provided by the actuator 20. As is shown in FIG. 13, a bottom end of the actuator 20 comes into contact with an uppermost end of the rivet 21. The actuator 20 and the balls 404 act together to ensure that the rivet 21 has the correct orientation to allow the rivet to be inserted into the sheets of material 422, 423.

When two balls 404 are used, centralisation of the rivet within the central bore 403 may be incomplete. Referring to FIG. 12, the rivet 21 is centralised in a first horizontal direction in the central bore 403 by the balls 404. However, as may be seen in FIG. 13 the rivet 21 is not centralised in a transverse direction, and may be displaced to one side of the central bore 403. The horizontal displacement of the rivet 21 in the central bore 403 may be sufficiently small that the rivet may be pushed into a workpiece with a desired accuracy.

An advantage which arises from using only two balls 404 may be understood by referring again to FIG. 11. The width of the nose end-block 402 is less in a horizontal direction which is transverse to the radial bores 405 than would be the case if more balls were provided. Although the different perspectives between FIG. 11 and FIG. 8 may make comparison between the embodiments of those figures difficult, it will be understood by those skilled in the art that the nose end block 402 of the embodiment shown in FIG. 11 may be made less wide than the nose end block 102a of the embodiment shown in FIG. 8 (for a given diameter of rivet).

The diameter of the central bore 403 may be sufficiently narrow, taking into account the diameter and length of rivets which will be used, that it is not possible for a rivet to fall upside down as it travels along the central bore.

Figure 14:
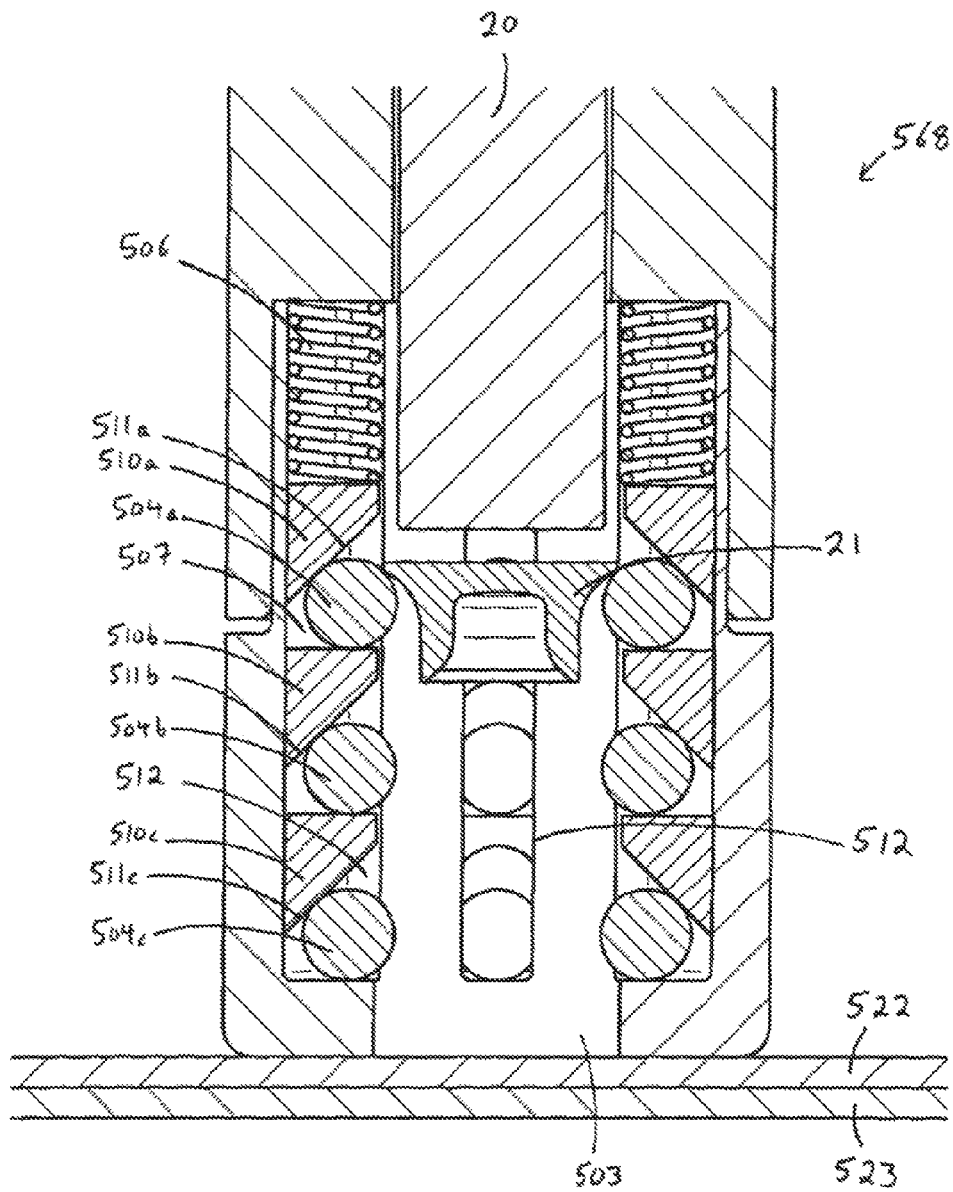
FIGS. 14-16 are cross-sectional views of a nose assembly of a fastener apparatus according to a further alternative embodiment of the invention.

A further alternative embodiment of the invention is shown in cross-section in FIG. 14. This embodiment of the invention may help to prevent rivets from falling upside down in a central bore of a nose assembly. Features which are present at several locations in the nose assembly are labelled only on the left side in order to avoid over complicating the figure. The nose assembly 568 shown in FIG. 14 includes four sets of balls 504a-c, balls of each set being spaced apart in an axial direction. The sets of balls 504a-c are distributed around a central bore 503 of the nose assembly 568. Each set of balls is contained in an axially extending bore 507. The axially extending bore 507 includes an axially orientated opening 512 which is sufficiently wide to allow the balls 504 to partially project from the opening but is sufficiently narrow too prevent the balls from falling out of the opening. The axially extending bore is sufficiently deep in a radial direction to allow some movement of the balls 504 in the radial direction.

A piston 510a-c is located above each ball 504a-c of the set of balls. A first piston 510a and is located between an upper ball 504a and a spring 506. Second and third pistons 510b,c are located between adjacent balls 504a-c. Each piston 510a-c includes a sloping surface 511a-c which may be considered to be an example of a force transfer surface. The sloping surface 511a-c subtends an angle of around 45° relative to the axial direction, but may subtend any other suitable angle. One end of the spring 506 abuts against an upper surface of the uppermost piston 510a and an opposite end of the spring abuts against an upper end of the axial bore 507. The spring 506 thus resiliently biases the uppermost piston 510a downwards, and the sloping surface 511a of that piston pushes the ball 504a located beneath it radially inwardly such that it projects from the opening 512. The uppermost ball 504a pushes the middle piston 510b downwards, and the sloping surface 511b of that piston pushes the middle ball 504b located beneath it radially inwardly such that it projects from the opening 512. The lowermost ball 504c is similarly pushed such that it projects from the opening 512.

In use, a rivet 21 is introduced into the central bore 503. The rivet does not travel down to the bottom end of the central bore 503 but instead is retained by the uppermost balls 504a. By preventing the rivet 21 from falling to the bottom of the bore 503, the uppermost balls 504a reduce the likelihood that the rivet will fall upside down in the central bore. The rivet 21 does not travel further through the central bore 503 until it is pushed by the actuator 20. The actuator 20 pushes the rivet 21 downwards through the central bore 503, and the balls 504a-c assist in maintaining the rivet in the correct orientation whilst it is travelling through the central bore.

Figure 15:
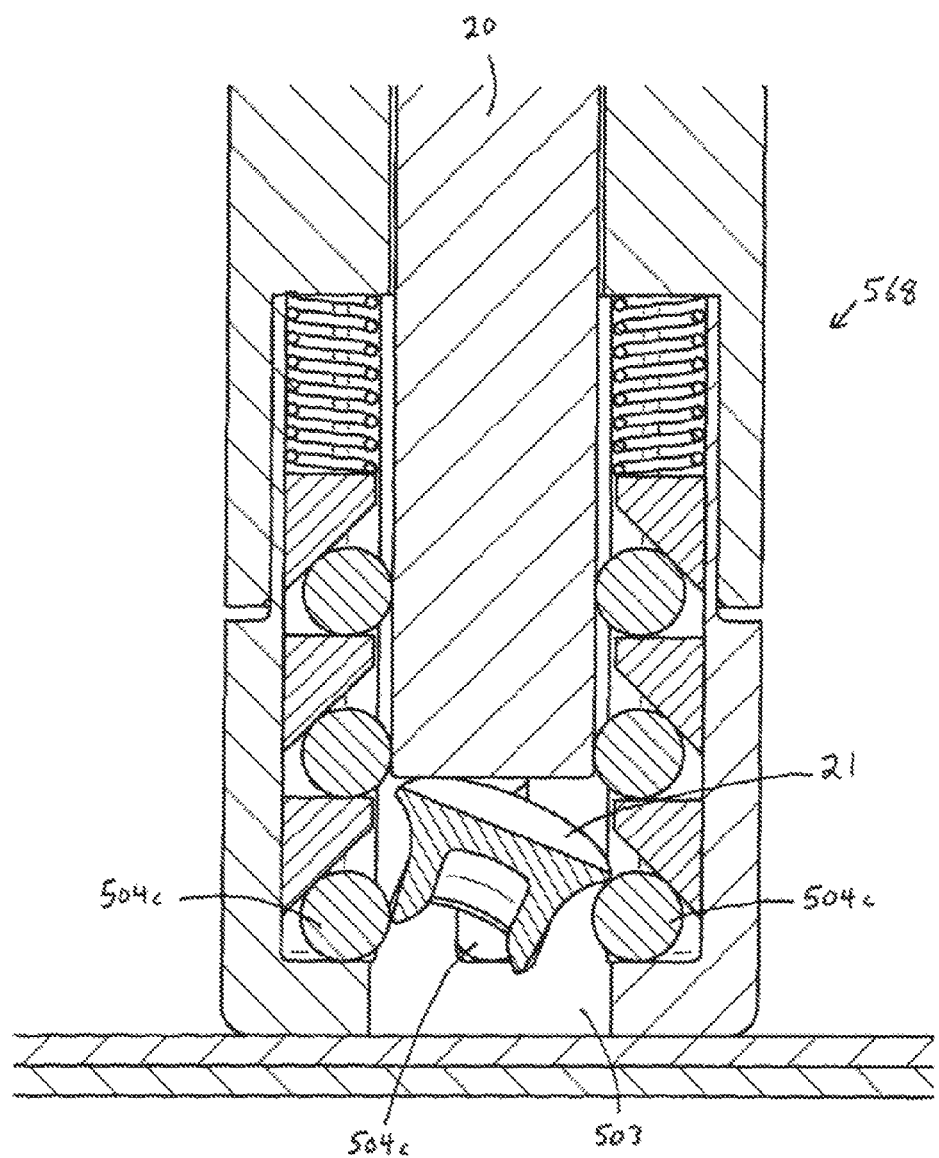

FIG. 15 shows the nose assembly 568 of FIG. 14, but with the rivet 21 further down the central bore 503. The rivet 21 has become partially rotated, but is not upside down. As will be apparent from consideration of the positions of the lowermost balls 504c and the dimensions of the rivet 21, the balls 504c prevent further rotation of the rivet and therefore prevent the rivet from turning upside down.

Figure 16:
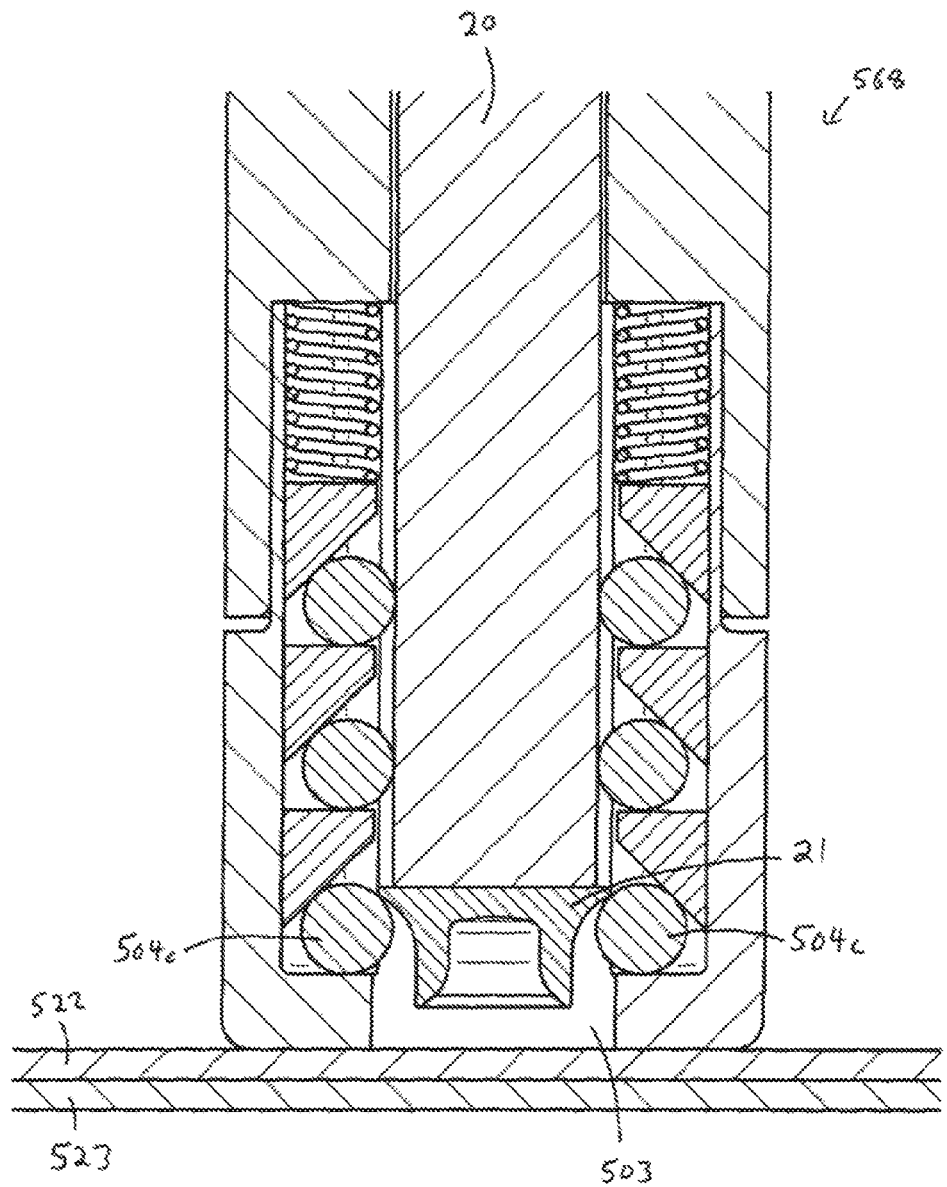

FIG. 16 shows the nose assembly 568 of FIGS. 14 and 15, but with the rivet 21 having had its orientation corrected by the balls 504c and the actuator 20, such that the rivet may be inserted into sheets of material 522, 523 with the correct orientation.

Although each set of balls comprises three balls in FIGS. 14-16, each set of balls may comprise any suitable number of balls (e.g. two balls, four balls, five balls or more). Although the sets of balls are provided in axially extending bores 507, they may be provided in bores which include a non-axial component.

Force transfer surfaces other than the sloping surfaces 511 may be used. The pistons may independently moveable (as illustrated) or may be connected together such that they move together.

Features of the embodiment shown in FIGS. 14-16 may be combined with features of other embodiments.

Although embodiments of the invention use balls to control the orientation of the rivet rollers may be used instead. A roller may for example be used instead of each pair of balls 104 of the embodiment shown in FIGS. 5-7 or the embodiment shown in FIG. 10. Two rollers may be provided in the nose assembly. Alternatively, three or more rollers may be provided in the nose assembly. The rollers may for example be provided with a cylindrical surface which engages a rivet in use. Alternatively, the rollers may include a shaped surface such as a concave curved surface. The rollers may for example include a concave curved surface which is dimensioned to receive part of a rivet.

An advantage of using balls rather than rollers is that balls are generally cheaper than rollers. This is because balls of many different sizes are manufactured by various manufacturers and are widely available, whereas rollers are less widely available. If rollers having desired dimensions and/or shape are not commercially available then manufacturing of bespoke rollers may be necessary.

In an embodiment, the nose assembly may be provided with only two balls, the balls for example being provided on opposite sides of a central bore of the nose assembly. In an embodiment, the nose assembly may be provided with only two rollers, the rollers for example being provided on opposite sides of a central bore of the nose assembly.

Embodiments of the invention described above use balls or rollers to control the orientation of the rivet at a bottom end of the nose assembly such that the rivet has a desired orientation when it is inserted into a workpiece. In alternative embodiments of the invention the balls or rivets alternatively or additionally are provided at other locations within the nose assembly. The balls or rollers may be for example be provided further up the nose assembly, for example adjacent to a location where a rivet is introduced into the nose assembly, or part way between that location and the bottom end of the nose assembly. The balls or rollers may assist in ensuring that a rivet has a desired orientation before arrives at the bottom end of the nose assembly, and/or may assist in preventing the rivet form tumbling into an upside down orientation.

Although the figures have all shown the nose assembly 68, 168, 268, 368 in a vertical orientation, the nose assembly may be provided in any orientation (the orientation may change for different riveting jobs). Therefore, the terms arising from the orientation of the nose assembly are used in the description merely to aid description of the invention, and are not intended to imply that any element of the apparatus must have a particular orientation.

When the fastener insertion apparatus is horizontal or is upside down, gravity will not cause the rivet to travel towards the balls or rollers in the nose assembly. Where this is the case, movement of the rivet through the nose assembly may be provided by the actuator pushing the rivet.

The biasing force is provided in the embodiments shown in FIGS. 3-8 using mechanical springs, and is provided in the embodiment shown in FIG. 9 using rubber or plastic. These may be considered to be examples of passive biasing members. A further alternative passive biasing member (not illustrated) may be a pneumatic spring. The biasing force is provided in the embodiment shown in FIG. 10 using a pneumatic actuator. This may be considered to be an example of an active biasing member. Biasing members from any embodiment of the invention may be used in any other embodiment of the invention. Any other suitable biasing member may be used.

Although the springs shown in illustrated embodiments of the invention are helical springs, any other suitable form of spring may be used.

In described embodiments of the invention the biasing members are oriented axially (i.e. oriented parallel to the direction of movement of the actuator). However, it is not essential that the biasing members are oriented axially. The biasing members may for example be oriented substantially axially, or may be oriented at an angle which is between the radial direction and the axial direction (e.g. having an angle of up to 10° relative to the axial direction, having an angle of up to 20° from the axial direction, etc). Orienting a biasing member such that it subtends a significant angle relative to the axial direction has the disadvantage however that it may increase the diameter of the nose assembly.

In above embodiments of the invention the balls or rollers are provided in what are referred to as radially extending bores 5, 105, 205. In this context the term 'radially' may be interpreted as meaning radial relative to a central axis of the actuator 20. The bores may be substantially radial, i.e. may be generally radial but not precisely radial. The bores may be oriented in directions which are substantially orthogonal to the direction of travel of the actuator 20. The substantially orthogonal directions of the bores may be such that they intersect with the central axis of the actuator 20 or may be such that they do not intersect with the central axis of the actuator. The bores may oriented in directions which are not substantially orthogonal to the direction of travel of the actuator 20, although orientation of the bores in a direction which has a significant non-orthogonal component may reduce the effectiveness of the balls or rollers in controlling the orientation of the rivet.

In described embodiments of the invention the sloping surface which acts as a force transfer surface subtends an angle of 45° relative to the axial direction. However, the force transfer surface may subtend any suitable angle. Although the sloping surface has been described as being planar or frustoconical, the sloping surface may have any suitable shape and may for example be curved.

Embodiments of the invention may use balls or rollers to apply force to a head of a rivet (i.e. a flared portion at the top of the rivet) and/or to apply force to a stem of the rivet (i.e. a generally cylindrical portion beneath the head of the rivet). The invention may be used in connection with rivets (or other fasteners) which have heads of different styles, for example a pan or flat head style or extended threaded head.

Described embodiments of the nose end-block have either been cylindrical or generally cylindrical with one or more flat sides. However, the nose end-block may have any suitable shape.

The term 'central bore' is used for convenience to refer to the bore of the nose block through which a rivet passes. It is not intended to imply that that bore must be centrally located within the nose block.

Although embodiments of the invention are described above in connection with rivets, embodiments of the invention may be used in connection with other fasteners. The term "fastener" may be interpreted as including rivets, screws, slugs, weld studs, mechanical studs and other types of fastening devices.

The above described fastener insertion apparatus may be considered to be examples of fastener delivery apparatus since they deliver a fastener to a workpiece. Other fastener delivery apparatus (not illustrated) which embody the invention may deliver a fastener such as a weld stud or mechanical stud to a workpiece without inserting the fastener into the workpiece.

Features of embodiments of the invention may be used in combination with features of other embodiments of the invention.

The invention claimed is:

1. A fastener delivery apparatus comprising:
   a nose assembly configured to releasably hold a fastener;
   wherein the nose assembly comprises an actuator, a central bore through which the fastener travels when urged to do so by the actuator, a plurality of balls or rollers and associated biasing members configured to provide a biasing force which biases the balls or rollers such that they engage with the fastener,
   wherein each biasing member is configured to exert force in a first direction and the associated ball or roller is configured to move in a second direction which is inwards towards the central bore and which is different from the first direction,
   wherein a force transfer surface is provided between each ball or roller and the biasing member, the force transfer surface acting to convert at least a component of the force exerted by the biasing member in the first direction into force exerted on the ball or roller in the second direction such that the balls or rollers are moved in the second direction exclusively by the force exerted by the force transfer surface,
   wherein each ball or roller is constrained such that movement in any direction other than the second direction is substantially prevented, and
   wherein the apparatus is configured such that a force exerted by the actuator on the fastener overcomes the force exerted on the balls or rollers in the second direction, to move the balls or rollers in a direction opposite to the second direction and thereby enable the fastener to move past the balls or rollers in order for the fastener to pass through the central bore.

2. The fastener delivery apparatus of claim 1, wherein the second direction is a substantially orthogonal direction relative to a central axis of an actuator of the fastener delivery apparatus.

3. The fastener delivery apparatus of claim 1, wherein the second direction is substantially radial relative to a central axis of an actuator of the fastener delivery apparatus.

4. The fastener delivery apparatus of claim 1, wherein the first direction is substantially parallel to a direction of movement of the actuator of the fastener delivery apparatus.

5. The fastener delivery apparatus of claim 1, wherein each of the biasing members is a passive biasing member.

6. The fastener delivery apparatus of claim 5, wherein each of the passive biasing members comprises a mechanical spring, a resilient material or a pneumatic spring.

7. The fastener delivery apparatus of claim 1, wherein each of the biasing members is an active biasing member.

8. The fastener delivery apparatus of claim 7, wherein the active biasing member comprises a pneumatic actuator.

9. The fastener delivery apparatus of claim 1, wherein the force transfer surface comprises a sloping surface of a piston which engages with the ball or roller.

10. The fastener delivery apparatus of claim 9, wherein the sloping surface of the piston is frustoconical.

11. The fastener delivery apparatus of claim 9, wherein the sloping surface of the piston is planar.

12. The fastener delivery apparatus of claim 1, wherein the force transfer surface comprises an intermediate ball located between the biasing member and the ball or roller.

13. The fastener delivery apparatus of claim 1, wherein the force transfer surface is in contact with the plurality of balls.

14. The fastener delivery apparatus of claim 1, wherein two balls are provided, one on each side of the central bore of the nose assembly.

15. The fastener delivery apparatus of claim 1, wherein three or more balls are distributed around the central bore of the nose assembly.

16. The fastener delivery apparatus of claim 1, wherein two balls are provided adjacent to one another on one side of the central bore of the nose assembly and two balls are provided adjacent to one another on an opposite side of a central bore of the nose assembly.

17. The fastener delivery apparatus of claim 1, wherein each ball or roller is one of a set of a plurality of balls or rollers which is provided along the central bore of the nose assembly, a force transfer surface being associated with each ball or roller.

18. The fastener delivery apparatus of claim 17, wherein each force transfer surface comprises a piston, a first piston being located between the biasing member and a first ball or roller of the set of balls or rollers, and a second piston being located between the first ball or roller and the second ball or roller of the set of balls or rollers.

19. The fastener delivery apparatus of claim 1, wherein the ball or roller is provided in the bore which extends in the second direction, walls of the bore acting to constrain movement of the ball or roller such that the ball or roller moves in the second direction.

20. The fastener delivery apparatus according to claim 1, wherein a first ball or roller of the plurality of balls or rollers is provided on one side of the central bore of the nose assembly and a second ball or roller of the plurality of balls or rollers is provided on an opposite side of the central bore of the nose assembly.

21. A method of delivering a fastener to a workpiece comprising:
moving a fastener through a central bore of a nose assembly of a fastener insertion apparatus and into the workpiece using an actuator,
wherein the orientation of the fastener is controlled at least in part by a plurality of balls or rollers and associated biasing members which provide a biasing force which biases the balls or rollers such that they engage with the fastener,
wherein each biasing member exerts force in a first direction and the ball or roller moves in a second direction inwards toward the central bore which is different from the first direction,
wherein a force transfer surface is provided between each ball or roller and the biasing member, the force transfer surface acting to convert at least a component of the force exerted by the biasing member in the first direction into force exerted on the ball or roller in the second direction such that the balls or rollers are moved in the second direction exclusively by the force exerted by the force transfer surface,
wherein each ball or roller is constrained such that movement in any direction other than the second direction is substantially prevented, and
wherein the apparatus is configured such that a force exerted by the actuator on the fastener overcomes the force exerted on the balls or rollers in the second direction, to move the balls or rollers in a direction opposite to the second direction and thereby enable the fastener to move past the balls or rollers in order for the fastener to pass through the central bore.

22. The method of claim 21, wherein the method further comprises joining the workpiece by inserting the fastener into the workpiece.

23. A nose assembly configured to releasably hold a fastener, the nose assembly comprising:
an actuator;
a central bore which the fastener is configured to travel through when urged to do so by the actuator;
a plurality of balls or rollers and associated biasing members configured to provide a biasing force which biases the balls or rollers such that they engage with the fastener,
wherein each biasing member is configured to exert force in a first direction and the associated ball or roller is configured to move in a second direction which is inward toward the central bore and which is different from the first direction,
wherein a force transfer surface is provided between each ball or roller and the biasing member, the force transfer surface acting to convert at least a component of the force exerted by the biasing member in the first direction into force exerted on the ball or roller in the second direction such that the balls or rollers are moved in the second direction exclusively by the force exerted by the force transfer surface,
wherein each ball or roller is constrained such that movement in any direction other than the second direction is substantially prevented, and
wherein the apparatus is configured such that a force exerted by the actuator on the fastener overcomes the force exerted on the balls or rollers in the second direction, to move the balls or rollers in a direction opposite to the second direction and thereby enable the fastener to move past the balls or rollers in order for the fastener to pass through the central bore.

\* \* \* \* \*